United States Patent
Wu et al.

(10) Patent No.: US 10,246,378 B2
(45) Date of Patent: Apr. 2, 2019

(54) BUILDING PRODUCTS COMPOSITES AND METHODS

(71) Applicant: Georgia-Pacific Gypsum LLC, Atlanta, GA (US)

(72) Inventors: Mianxue Wu, Suwanee, GA (US); Jeffery T. Fields, Suwanee, GA (US); Sara E. Endres, Peachtree Corners, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 6 days.

(21) Appl. No.: 14/884,185

(22) Filed: Oct. 15, 2015

(65) Prior Publication Data

US 2016/0107937 A1   Apr. 21, 2016

Related U.S. Application Data

(60) Provisional application No. 62/064,506, filed on Oct. 16, 2014.

(51) Int. Cl.
| | | |
|---|---|---|
| *C04B 38/00* | (2006.01) | |
| *E04C 2/04* | (2006.01) | |
| *C04B 111/40* | (2006.01) | |

(52) U.S. Cl.
CPC .......... *C04B 38/0074* (2013.01); *E04C 2/043* (2013.01); *C04B 2111/40* (2013.01)

(58) Field of Classification Search
CPC .. C04B 38/0074; C04B 2111/40; E04C 2/043
USPC .......................................... 428/219; 106/680
See application file for complete search history.

(56) References Cited

U.S. PATENT DOCUMENTS

| | | | | |
|---|---|---|---|---|
| 4,906,449 A | * | 3/1990 | Kosugi | ................... B28B 7/344 106/772 |
| 4,965,031 A | | 10/1990 | Conroy | |
| 2006/0029786 A1 | | 2/2006 | Wang et al. | |
| 2006/0174572 A1 | * | 8/2006 | Tonyan | ..................... B32B 3/06 52/481.2 |
| 2007/0122604 A1 | * | 5/2007 | Wang | ................... B28B 19/0092 428/294.7 |
| 2008/0152945 A1 | | 6/2008 | Miller et al. | |
| 2014/0315008 A1 | * | 10/2014 | Francis | ............... B28B 19/0092 428/220 |

FOREIGN PATENT DOCUMENTS

| | | |
|---|---|---|
| CN | 1477242 A | 2/2004 |
| WO | WO-2012122102 A2 * | 9/2012 ......... B28B 19/0092 |

OTHER PUBLICATIONS

International Search Report and Written Opinion for International Application No. PCT/US2015/055706 dated Jan. 7, 2016 (10 pages).

* cited by examiner

*Primary Examiner* — Brian Handville
(74) *Attorney, Agent, or Firm* — Eversheds Sutherland (US) LLP; Stacy Fredrich; Ram W. Sabnis

(57) ABSTRACT

Methods of manufacturing composites are provided, including combining dihydrate calcium sulfate whiskers, hemihydrate calcium sulfate stucco, and water to form a slurry, and setting the slurry to form a composite having a natural porosity of about 60 volume percent or greater. Composites are also provided, including dihydrate calcium sulfate whiskers and dihydrate calcium sulfate crystals, and having a natural porosity of about 60 volume percent or greater.

13 Claims, 5 Drawing Sheets

BUILDING PRODUCTS COMPOSITES AND METHODS

CROSS-REFERENCE TO RELATED APPLICATIONS

This application claims priority benefit of U.S. Provisional Application No. 62/064,506, filed on Oct. 16, 2014, which is incorporated by reference herein.

TECHNICAL FIELD

The present disclosure relates generally to the field of calcium sulfate-based products, and more particularly to calcium sulfate whiskers and composites and methods for their use and manufacturing.

BACKGROUND

Gypsum (calcium sulfate) panels are commonly used as sheathing panels in wall, door, floor, ceiling, roof, and other building applications. Lightweight gypsum panels are desirable for construction applications, for easier handling and installation. However, these lightweight boards should be manufactured to experience minimal loss of strength and integrity as compared to traditional boards.

Currently there are two known methods to manufacture lightweight gypsum boards. The first involves introducing a foaming agent into the gypsum stucco slurry to form bubbles in the gypsum board. This method often results in inconsistencies in foamed bubble size and bubble density in the board, due to process factors that are difficult to control, such as the timing of foaming initiation, the temperature of the slurry, and the pH of the formulation. This inconsistent bubble size can result in uneven density throughout the board and thereby diminish the strength and integrity of the board.

The second method involves incorporating hollow microspheres into the gypsum stucco slurry to decrease the density of the resulting board. However, this method can result in uneven density throughout the board and layer separation, for example due to the packing density of the microspheres being much lower than the slurry, resulting in diminished strength and integrity of the board.

Accordingly, there is a need for improved lightweight calcium sulfate composites and methods for their manufacture.

SUMMARY

In one aspect, methods of manufacturing calcium sulfate composites are provided including combining dihydrate calcium sulfate whiskers, hemihydrate calcium sulfate stucco, and water to form a slurry, and setting the slurry to form a composite having a natural porosity of about 60 volume percent or greater.

In another aspect, calcium sulfate composites are provided, including dihydrate calcium sulfate whiskers and dihydrate calcium sulfate crystals, and having a natural porosity of about 60 volume percent or greater.

BRIEF DESCRIPTION OF THE DRAWINGS

Referring now to the drawings, which are meant to be exemplary and not limiting, and wherein like elements are numbered alike.

DETAILED DESCRIPTION

Figure 1:
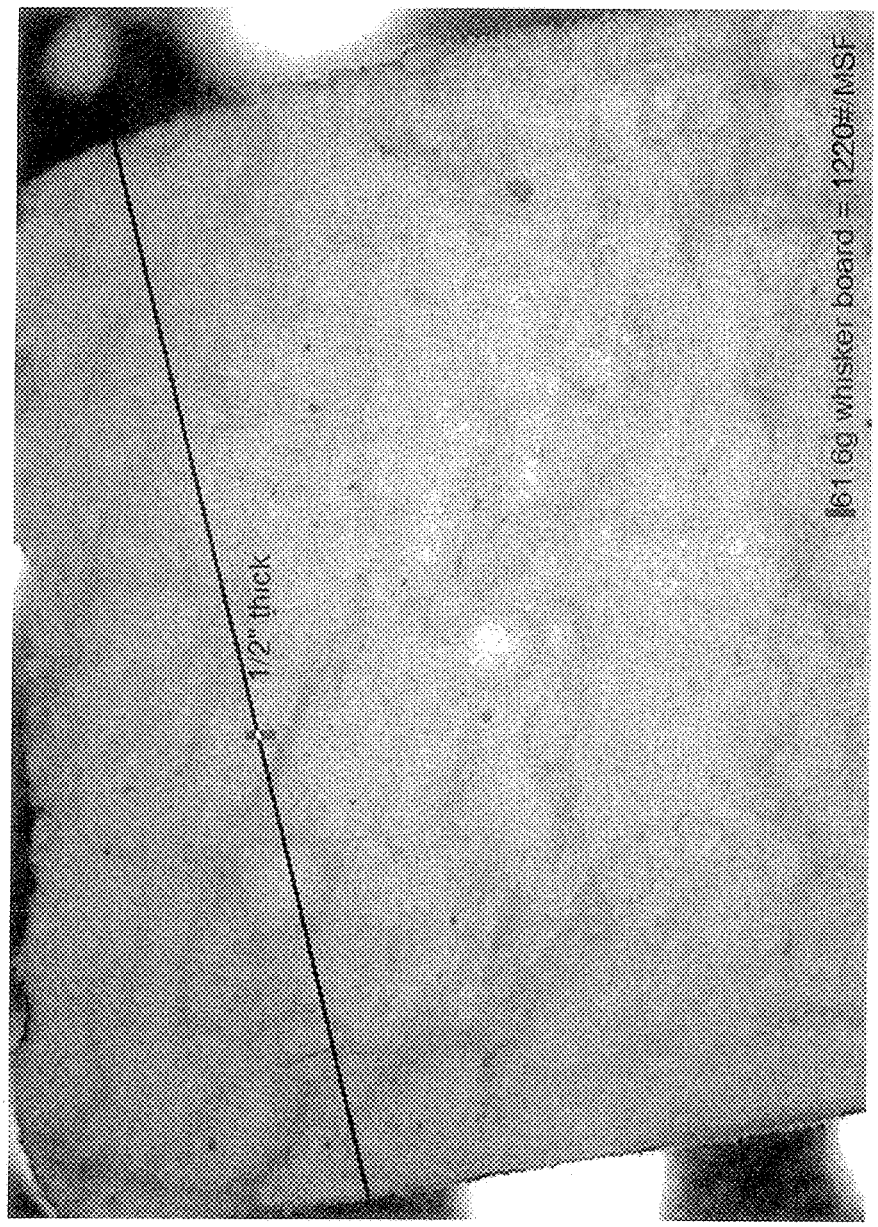
FIG. 1 is a photograph showing the pore structure of a calcium sulfate whisker composite at low magnification.

Disclosed herein are calcium sulfate-based whiskers and composites and methods for their use and manufacturing. These composites and methods meet one or more of the above-described needs by providing lightweight gypsum composites having enhanced strength and integrity properties compared to known lightweight composites. For example, the lightweight composites of the present disclosure may be made without foaming agents or microspheres, and therefore without the common problems associated with such composites.

As used herein, the term "whiskers" refers to single crystal fibers having an aspect ratio greater than 1. As used herein, the term "aspect ratio" refers to the ratio of the length of a calcium sulfate whisker to its diameter, and the "mean aspect ratio" is the ratio of the average whisker length to the average whisker diameter for a plurality of whiskers.

Generally, the whiskers disclosed herein are made using calcium sulfate, which may also be referred to as gypsum. Calcium sulfate may exist as a hemihydrate ($CaSO_4 * \frac{1}{2}H_2O$), a dihydrate ($CaSO_4 * 2H_2O$), or an anhydrite ($CaSO_4$). Generally, calcium sulfate hemihydrate may be used to prepare calcium sulfate whiskers. However, it should be understood that while the present disclosure generally relates to calcium sulfate whiskers, the use of other suitable whiskers is also envisioned and intended to fall within the scope of this disclosure. For example, other suitable particles, such as magnesium oxysulfate, may also be used.

Methods of Manufacturing Composites and Whiskers

In certain embodiments, methods of manufacturing composites are provided, including: (i) combining dihydrate calcium sulfate whiskers, hemihydrate calcium sulfate stucco, and water to form a slurry; and (ii) setting the slurry to form a composite having a natural porosity of about 60 volume percent or greater. As used herein, the term "natural porosity" refers to the air space within the composite that forms as the composite sets, as opposed to being induced in the composite. For example, known techniques utilizing microspheres and foaming agents result in an induced porosity of the composite.

In one embodiment, the dihydrate calcium sulfate whiskers and the hemihydrate calcium sulfate stucco are combined in amounts from about 1 percent by weight whiskers to about 35 percent by weight whiskers and from about 65 percent by weight stucco to about 99 percent by weight stucco, as measured on a dry basis. For example, the dihydrate calcium sulfate whiskers and the hemihydrate calcium sulfate stucco may be combined in amounts of about 80 percent by weight stucco and about 20 percent by weight whiskers, as measured on a dry basis. For example, the dihydrate calcium sulfate whiskers and the hemihydrate calcium sulfate stucco may be combined in amounts of about 90 percent by weight stucco and about 10 percent by weight whiskers, as measured on a dry basis.

In one embodiment, the dihydrate calcium sulfate whiskers are combined with the stucco and water in an amount at or above a predetermined percolation threshold. As used herein, the term "percolation" refers to the long-range, or overall (i.e., instead of localized whisker-to-whisker interconnection), tendency of the whiskers to be individualized and interconnected in the stucco. That is, when percolation is reached, a network of whiskers begins to form, such that shrinkage of the composite slows dramatically. Without being bound by a particular theory, it is believed that porosity can be created in a composite naturally, using tailored whisker geometry to achieve whisker-to-whisker percolation. For example, by predicting the percolation threshold of the whiskers, the packing density of the whiskers can be minimized while the natural porosity of the composite can be maximized, thereby improving the consistency of the porosity throughout the board as well as the amount of porosity of the board. In particular, it has been found that the percolation threshold of the whiskers can be lowered by making whiskers with a higher aspect ratio via a diluted slurry for crystals to freely grow and/or by making whiskers individualized via an "aging" process so that the whiskers take a long time to be separated.

For example, the predetermined percolation threshold may be determined using percolation models, such as those disclosed by Yi and Sastry in "Analytical approximation of the percolation threshold for overlapping ellipsoids of revolution," *Proc. R. Soc. Lond. A* (2004) 460, 2353-2380, which is incorporated herein by reference. These models indicate that the percolation threshold of whisker-to-whisker percolation can be predicted as function of whisker aspect ratio and of the amount of whiskers present. It has been determined that the greater the aspect ratio of the whiskers, the smaller the critical mass necessary to achieved percolation.

Based on percolation models, it has been determined that for a 99 percent chance of achieving whisker percolation, approximately 10 volume percent of whiskers having an aspect ratio of about 10 is needed. For a 99 percent chance of achieving whisker percolation, approximately 35 volume percent of whiskers having an aspect ratio of about 1 (i.e., near spherical particles) is needed. For whiskers having an aspect ratio of about 2, approximately 32 volume percent whiskers is needed for a 99 percent chance of achieving whisker percolation. For whiskers having an aspect ratio of about 4, approximately 23 volume percent whiskers is needed for a 99 percent chance of achieving whisker percolation. Based on these models, the percolation threshold can be determined for whiskers having a known aspect ratio. As used herein percentages given are volume percentages, unless otherwise specified.

Whisker clustering, or agglomeration, is also believed to affect the percolation threshold, and can be used to predict the amount of whiskers having a given aspect ratio that is necessary to achieve percolation. For example, according to models such as those by Yi and Sastry, for whiskers having an aspect ratio of approximately 20, the percolation threshold may range from about 2 volume percent of whiskers for no clustering/agglomeration (i.e., minimum packing and maximum porosity), to about 6 volume percent where whisker clusters of about 3 whiskers per cluster occur, and to much greater than 6 volume percent where whisker clusters of much great than 3 whiskers per cluster occur (i.e., maximum packing, minimum porosity).

Thus, the percolation threshold amount of whiskers can be determined based on the aspect ratio of the whiskers and the observed agglomeration tendency of the whiskers. Whiskers may be combined with the stucco at or above the threshold amount to build a framework for the overall composite structure and hinder the shrinkage of the gypsum-water structure, without using foaming agents or microspheres.

In certain embodiments, the whiskers have a mean aspect ratio of at least about 2. For example, the whiskers may have a mean aspect ratio from about 2 to about 20. In one embodiment, the whiskers have a mean aspect ratio from about 10 to about 20. For example, the whiskers may have an aspect ratio from about 2 to about 30. As explained above, based on the aspect ratio of the whiskers, percolation models may be used to determine the amount of whiskers to add to the stucco to achieve the desired porosity.

For example, composites made by these methods may display a natural porosity of about 60 volume percent or greater, such as from about 60 volume percent to about 99 volume percent. In one embodiment, the composite has a natural porosity of about 75 volume percent or greater. For example, the composite may have a natural porosity of about 80 volume percent, about 90 percent, or from about 75 to about 95 volume percent.

In certain embodiments, composites made by these methods have a density of about 40 lb/ft$^3$ or less (approximately 640 kg/m$^3$ or less). For example, the composites may have a density of about 30 lb/ft$^3$ or less (approximately 480 kg/m$^3$ or less). In one embodiment composites made by these methods have a density from about 20 lb/ft$^3$ to about 50 lb/ft$^3$ (approximately 320 kg/m$^3$ to 800 kg/m$^3$). Thus, these methods produce lightweight composite boards without the use of foaming agents or microspheres.

Without being bound by a particular theory, it is believed that the combination of dihydrate calcium sulfate whiskers, hemihydrate calcium sulfate stucco, and water results in the conversion of the hemihydrate particles into dihydrate particles, during the mixing and setting steps. Thus, the set composite contains dihydrate whiskers and crystal particles. For example, the combining and setting steps may include any suitable methods, such as mixing, allowing the composite to set at room temperature, and/or drying the composite.

The methods may further include steps to make the dihydrate calcium sulfate whiskers for use in composite manufacturing. In certain embodiments, the method further includes: (i) combining hemihydrate calcium sulfate stucco and water to form a slurry of dihydrate calcium sulfate crystals; and (ii) ageing the slurry under ambient conditions to form dihydrate calcium sulfate whiskers in water. For example, the ratio of stucco to water and the ageing period may be tailored to achieve the desired whisker geometry.

In one embodiment, the method also includes removing at least a portion of the water from the dihydrate calcium sulfate whiskers in water to form dewatered calcium sulfate whiskers. In certain embodiments, the step of dewatering includes filtering, vacuuming, centrifuging, or a combination thereof. For example, a screen filter may be used to dewater the whiskers. In one embodiment, the dihydrate calcium sulfate whiskers are wet dihydrate calcium sulfate whiskers that have been dewatered to about 50 percent water to about 70 percent water, as measured by weight of the wet whiskers.

Another advantage of the disclosed methods is that the whiskers used in the composite manufacturing steps may be prepared through a simple process at ambient pressure/ temperature that does not require autoclaving or high temperature burning like other whisker-forming methods.

Composites

In certain embodiments, composites are also provided. For example the composites may be those manufactured according to any of the methods described above.

In one embodiment, a composite includes dihydrate calcium sulfate whiskers and dihydrate calcium sulfate crystals, and has a natural porosity of about 60 volume percent or greater. In one embodiment, the composite has a natural porosity from about 60 volume percent to about 99 volume percent. For example, the composite may have a natural porosity of about 75 volume percent or greater. For example, the composite may have a natural porosity of about 80 volume percent or about 90 percent. In one embodiment, the composite has a natural porosity of about 90 volume percent or greater.

In certain embodiments, the composite has a density of about 40 lb/ft$^3$ or less (approximately 640 kg/m$^3$ or less). For example, the composite may have a density of about 30 lb/ft$^3$ or less (approximately 480 kg/m$^3$ or less). In one embodiment, the composite has a density from about 20 lb/ft$^3$ to about 50 lb/ft$^3$ (approximately 320 kg/m$^3$ to 800 kg/m$^3$).

In certain embodiments, the composite is a gypsum board having a thickness of about 1 inch (2.54 cm) or less and an area density of about 1500 lb/msf (approximately 7300 g/m$^2$) or less. In one embodiment, the composite is a gypsum board having a thickness of about 1 inch (2.54 cm) or less and an area density of about 1200 lb/msf (approximately 5900 g/m$^2$) or less. For example, the composite may have an area density from about 1000 lb/msf to about 2000 lb/msf (approximately 4900 g/m$^2$ to 9800 g/m$^2$), with a thickness from about 1/16 inch (0.16) cm to about 1 inch (2.54 cm).

EXAMPLES

Embodiments of the calcium sulfate whiskers and composites disclosed herein were manufactured and their properties were tested. The results are shown below and at FIGS. 1-4.

Two sample composite boards were manufactured according to the slurry compositions given in Tables 1 and 2 below. Sample 1 contained 65% stucco and 35% dihydrate (DH) whiskers having a mean aspect ratio between 10 and 15, as measured on a dry basis, in the slurry. Sample 2 contained 80% stucco and 20% DH whiskers, as measured on a dry basis, in the slurry. The ingredients were combined and mixed in a glass blender on high for 5-10 seconds. The mixed slurry was then poured into a 4 inch×4 inch mold and allowed to set into a ½ inch thick board.

TABLE 1

| Sample 1 Slurry Composition | |
| --- | --- |
| Ingredient | Amount in Slurry |
| Stucco | 97.5 g |
| DH Whisker (Dewatered to 50% Water) | 105 g |
| Potash | 0.38 g |
| Boric Acid | 0.42 g |
| Starch | 0.84 g |
| Fiberglass | 0.21 g |
| Water | 135 g |
| Retarder (VERSENEX 80 (pentasodium diethylenetriaminepentaacetate), supplied by Dow Chemical Company, Midland, Michigan) | 0.06 g |

TABLE 1-continued

| Sample 1 Slurry Composition | |
| --- | --- |
| Ingredient | Amount in Slurry |
| Dispersant (DILOFLO (polynapthalene sulfonate), supplied by GEO Specialty Chemicals, Ambler, Pennsylvania) | 0.173 g |

TABLE 2

| Sample 2 Slurry Composition | |
| --- | --- |
| Ingredient | Amount in Slurry |
| Stucco | 120 g |
| DH Whisker (Dewatered to 70% Water) | 100 g |
| Potash | 0.38 g |
| Boric Acid | 0.42 g |
| Starch | 0.84 g |
| Fiberglass | 0.21 g |
| Water | 50 g |
| Retarder (VERSENEX 80) | 0.12 g |
| Dispersant (DILOFLO) | 0.173 g |

It was observed that the set time of the composites was very rapid, due to the dihydrate whiskers acting as a natural seeding agent for quickly converting the stucco into dihydrate crystals. That is, the dihydrate whiskers are believed to act as an accelerator, providing nuclei for the reaction. Thus, a further benefit of the disclosed methods and composites is a quick-set composite without the use of a Ball Milled Accelerator (BMA) to increase setting speed.

The porosities of the samples were determined based on the observed density of the board and the true density of the materials. Sample 1 had a porosity of approximately 80%, with an area density of approximately 1200 lb/msf for the ½ inch board. Sample 2 had a porosity of approximately 75%, with an area density of approximately 1500 lb/msf for the ½ inch board.

These results were surprising because a sample with no whiskers (i.e., stucco only) would be expected to display about 50% porosity, with porosities of 75% or more attainable only with the use of foaming agents or microspheres. That is, the disclosed methods may use only stucco and whiskers that are themselves made from common stucco, in a simple mixing and ageing process under ambient pressure, to form lightweight boards without the use of foaming agents or microspheres. Accordingly, the process can be very economical and efficient.

Figure 2:
FIG. 2 is a micrograph showing the crystal and pore structure of a calcium sulfate whisker composite at high magnification.
Figure 5:
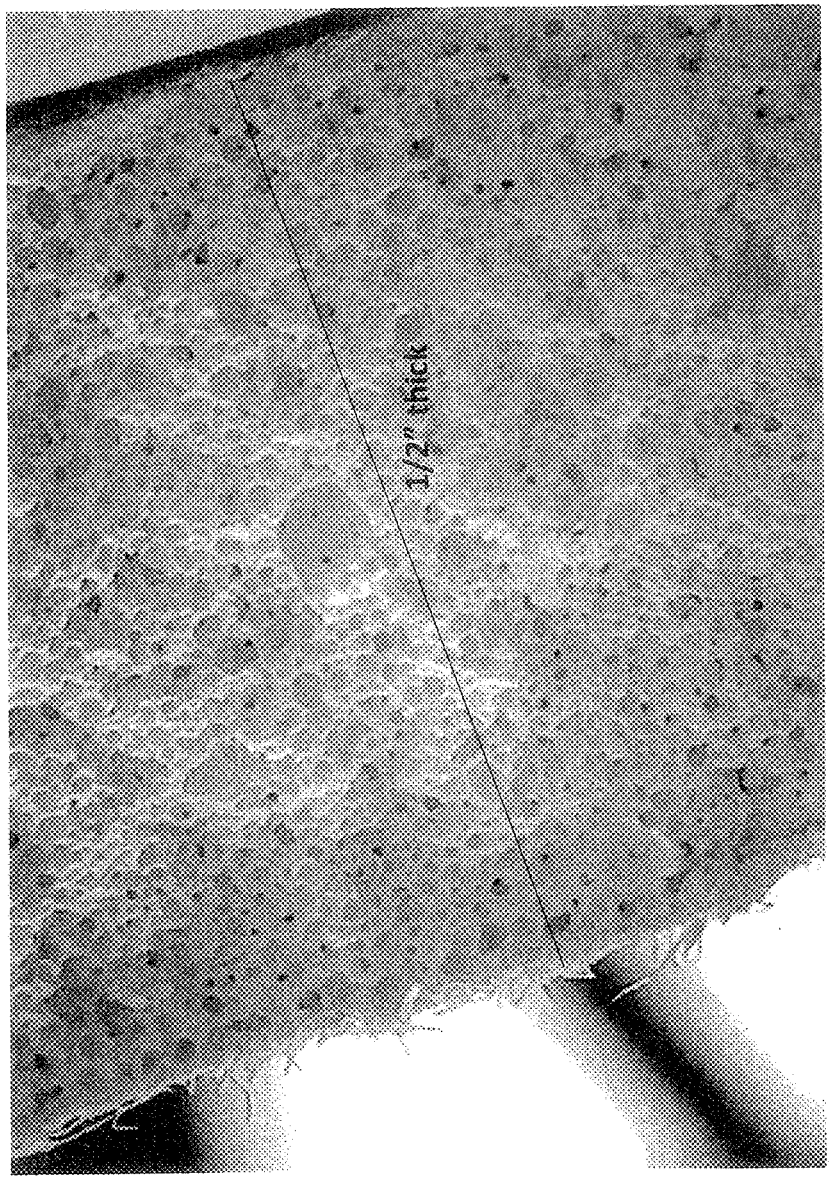
FIG. 5 is a photograph showing the pore structure of a prior art foamed composite at low magnification.

Photographs and micrographs of the samples were taken at various points during the composite manufacturing process. FIG. 1 is a low magnification photograph of the cross-section of the board of Sample 1, showing its pore structure. FIG. 2 is a high magnification micrograph of Sample 1, showing its crystal and pore structure. It was observed that the natural pore size is smaller and more uniform than the induced pores that result in similar board using foaming agents or microspheres. This is evidenced by a comparison of FIG. 1, which shows the small pore size and uniformity of pores in the composite board having a weight of 1220 pounds/msf of Sample 1, and FIG. 5, which shows a prior art composite board made with a foaming agent and having a weight of 1300 pounds/msf. The prior art board of FIG. 5 has significantly larger, and less uniform, pores, than a similar composite made using the calcium sulfate whiskers described herein.

Figure 3:
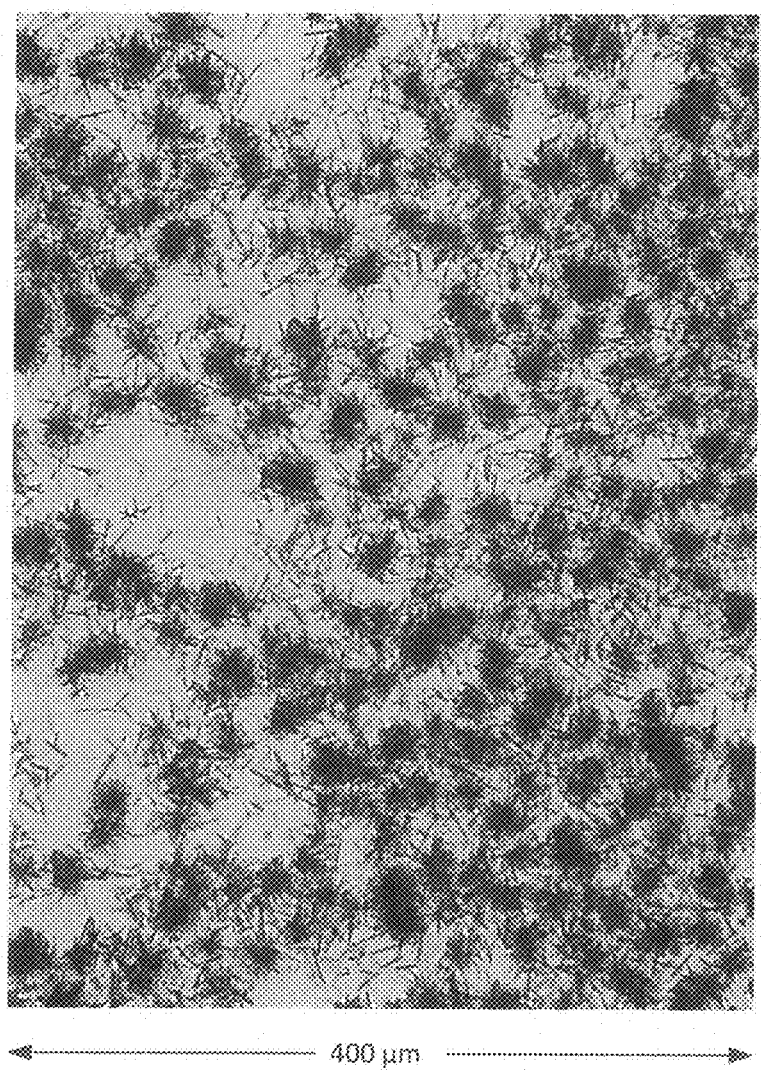
FIG. 3 is a micrograph showing the calcium sulfate whisker morphology of a calcium sulfate whisker slurry prior to ageing.
Figure 4:
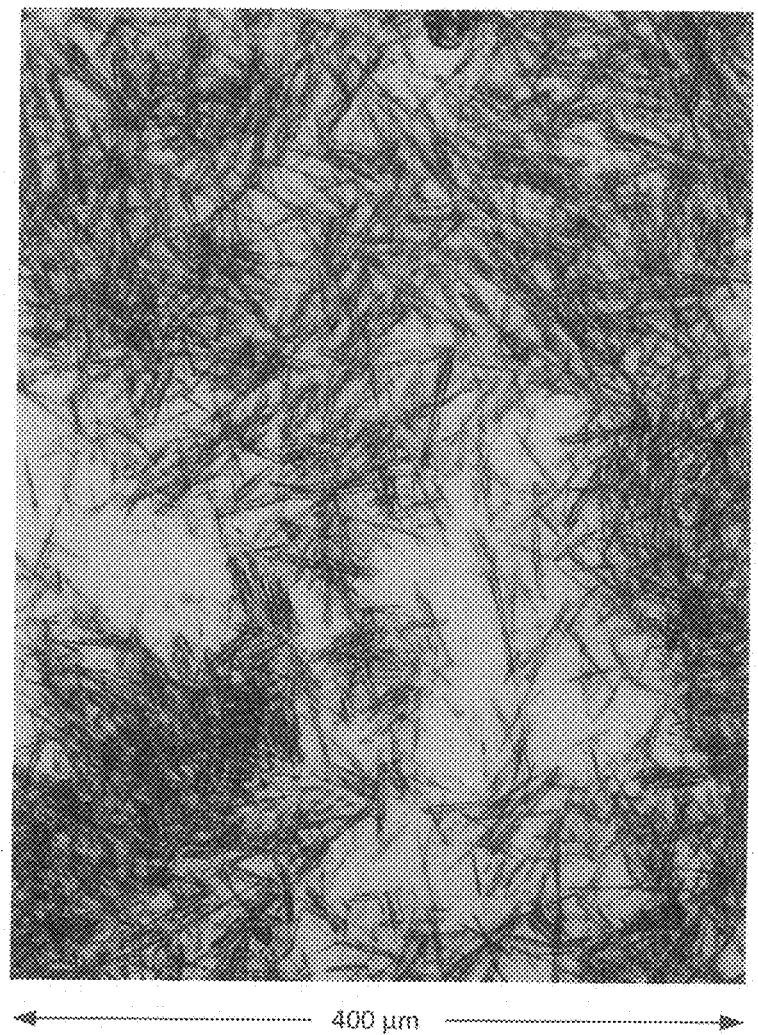
FIG. 4 is a micrograph showing the calcium sulfate whisker morphology of a calcium sulfate whisker slurry after ageing.

FIGS. 3 and 4 are micrographs showing the calcium sulfate whisker morphology of a calcium sulfate whisker slurry at two times during the ageing process (FIG. 4 being after ageing and dispersing of the whiskers occurs, and FIG. 3 being prior to ageing). That is, these micrographs show the ability to tailor the dihydrate whisker morphology (both length and agglomeration) to minimize packing density and maximize natural porosity.

Based on the Griffith Equation, in which $\sigma_f = \sqrt{2E\gamma/(\pi a_c)}$, or $s_f^*(a_c)^{1/2} \rightarrow$ constant, wherein $a_c$=critical size of defects, a porous composite having smaller pores will display higher strength. Accordingly, the composites disclosed herein will have a higher strength than composites having larger pores, such as those made using foaming agents or microspheres. Moreover, the composites disclosed herein display a more uniform board makeup than those having induced porosity, such that the board integrity is improved.

The disclosed high porosity lightweight boards offer easier installation and handling with little to no loss of board strength or integrity, as compared to traditional boards. Moreover, these boards offer improved strength properties as compared to known methods for producing lightweight boards.

While the disclosure has been described with reference to a number of embodiments, it will be understood by those skilled in the art that the disclosure is not limited to such disclosed embodiments. Rather, the disclosed embodiments can be modified to incorporate any number of variations, alterations, substitutions, or equivalent arrangements not described herein, but which are commensurate with the spirit and scope of the disclosure.

What is claimed is:

1. A composite, comprising:
    a nuclei seeding agent comprising dihydrate calcium sulfate whiskers; and
    dihydrate calcium sulfate crystals formed about the dihydrate calcium sulfate whiskers, such that the composite has a natural porosity of about 60 volume percent or greater and a density of about 40 lb/ft³ or less, wherein the composite does not contain a foaming agent or microspheres.

2. The composite of claim 1, wherein the composite has a natural porosity of about 75 volume percent or greater.

3. The composite of claim 1, wherein the composite has a natural porosity of about 90 volume percent or greater.

4. The composite of claim 1, wherein the composite has a density of about 30 lb/ft³ or less.

5. The composite of claim 1, wherein the composite comprises a gypsum board having a thickness of about 1 inch or less and an area density of about 1500 lb/msf or less.

6. The composite of claim 1, wherein the composite comprises a gypsum board having a thickness of about 1 inch or less and an area density of about 1200 lb/msf or less.

7. A composite, comprising:
    a nuclei seeding agent comprising dihydrate calcium sulfate whiskers; and
    dihydrate calcium sulfate crystals formed about the dihydrate calcium sulfate whiskers, such that the composite has a natural porosity of about 60 volume percent or greater,
    wherein the composite does not contain a foaming agent or microspheres.

8. The composite of claim 7, wherein the composite has a natural porosity of about 75 volume percent or greater.

9. The composite of claim 7, wherein the composite has a natural porosity of about 90 volume percent or greater.

10. The composite of claim 7, wherein the composite has a density of about 40 lb/ft³ or less.

11. The composite of claim 7, wherein the composite has a density of about 30 lb/ft³ or less.

12. The composite of claim 7, wherein the composite comprises a gypsum board having a thickness of about 1 inch or less and an area density of about 1500 lb/msf or less.

13. The composite of claim 7, wherein the composite comprises a gypsum board having a thickness of about 1 inch or less and an area density of about 1200 lb/msf or less.

* * * * *